(No Model.)

W. H. JOHNSON.
WIRE NETTING.

No. 278,147.  Patented May 22, 1883.

Witnesses:

Inventor:
Wm. H. Johnson
By Munn & Co.
Attorneys

UNITED STATES PATENT OFFICE.

WILLIAM H. JOHNSON, OF MANCHESTER, COUNTY OF LANCASTER, ENGLAND.

WIRE-NETTING.

SPECIFICATION forming part of Letters Patent No. 278,147, dated May 22, 1883.

Application filed November 24, 1882. (No model.) Patented in England August 9, 1881, No. 3,454.

*To all whom it may concern:*

Be it known that I, WILLIAM HENRY JOHNSON, of Manchester, in the county of Lancaster, England, merchant, have invented new and useful Improvements in Wire-Netting, (for which I have obtained a patent in Great Britain, No. 3,454, bearing date August 9, 1881,) of which the following is a specification.

My invention relates to improvements in wire-netting; and it consists in furnishing the netting with wires or bands having barbs at or near the middle of its meshes, the said barbs being formed by severing or notching the said wires or bands, as hereinafter fully described.

Figure 1:
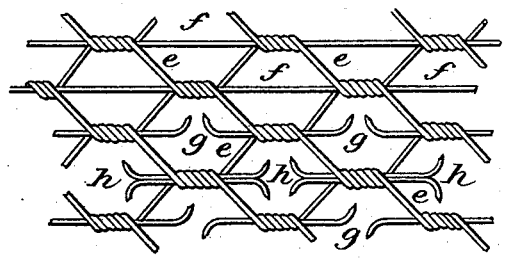
Figure 2:
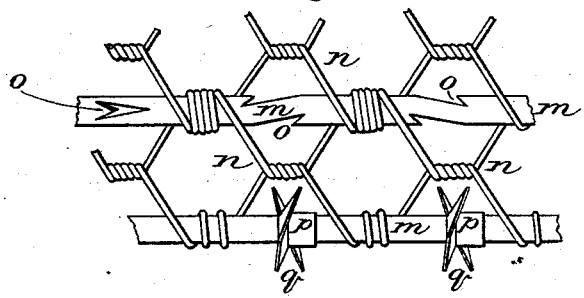

Reference is to be had to the accompanying drawings, forming a part of this specification, in which Figure 1 is a side elevation of my improvement. Fig. 2 is a side elevation of a modification, and Fig. 3 is a plan view of the same.

Referring to Fig. 1, $e\ e$ are the wires forming the netting, and during the process of manufacture I incorporate therewith extra wires $f$, which I subsequently sever, and bend the ends produced by such severance in any desired direction, so as to constitute barbs $g$; or, instead of incorporating one wire only, as shown at $f$, I incorporate two or more wires with the netting, which wires, upon being severed, will form a compound barb, as shown at $h$, which is a barb formed by two pieces of wire.

Figure 3:
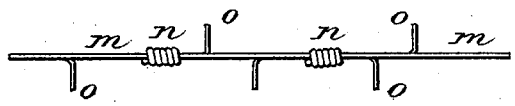

In the modification shown in Figs. 2 and 3 a band or bands of metal, $m$, are interlaced with the wire-netting $n$. The interlacing of the bands $m$ with the netting $n$ may take place during the process of its manufacture or subsequently thereto, as may be found most convenient. Upon the band or bands $m$, I form barbs $o$ by cutting or notching the said band or bands and bending the barbs so as to project from the band or bands, as shown in the plan, Fig. 3. The band or bands $m$ are also adapted to receive and support the barbs $p\ q$. The barbs, thus fixed to the wire-netting, tend to prevent persons or animals pressing against or climbing over and thereby injuring the netting.

I am aware that prior to my invention spikes and projections have been formed with or fixed on fencing and rails. I therefore do not claim such a combination, broadly; but What I do claim as my invention, and desire to secure by Letters Patent, is—

1. Wire-netting having wires or bands interwoven therewith, and provided with barbs at or near the middle of the meshes of the said netting, the said barbs being formed by severing or notching the said wires or bands, substantially as herein shown and described.

2. The combination, with wire-netting, of the interwoven wires $f$, provided with barbs $g$, formed by severing the said wires at the middle of the meshes of the netting, substantially as herein shown and described.

WILLIAM HENRY JOHNSON.

Witnesses:
  CHARLES A. BARLOW,
  S. WALKEY GILLETT.